(12) United States Patent
Maruyama et al.

(10) Patent No.: US 6,201,207 B1
(45) Date of Patent: Mar. 13, 2001

(54) TORCH ANGLE SETTING APPARATUS

(75) Inventors: Yoichi Maruyama, Chiba-ken; Takashi Kawaguchi, Ichikawa, both of (JP)

(73) Assignee: Koike Sanso Kogyo Co., Ltd., Tokyo (JP)

( * ) Notice: Subject to any disclaimer, the term of this patent is extended or adjusted under 35 U.S.C. 154(b) by 0 days.

(21) Appl. No.: 09/537,262

(22) Filed: Mar. 29, 2000

(30) Foreign Application Priority Data

Jan. 13, 2000 (JP) .............................................. 2000-004364

(51) Int. Cl.$^7$ .................................................... B23K 10/00
(52) U.S. Cl. ................. 219/121.39; 219/121.48; 219/121.45; 219/121.44; 219/124.33; 219/266; 219/62; 219/77
(58) Field of Search ......................... 219/121.39, 121.45, 219/121.44, 121.59, 121.48, 124.33, 124.1, 121.56; 266/62, 77, 57, 61, 68

(56) References Cited

U.S. PATENT DOCUMENTS

| | | | |
|---|---|---|---|
| 4,148,467 | * 4/1979 | Sargeant | 266/57 |
| 4,590,652 | * 5/1986 | Harwood | 29/157 R |
| 4,693,761 | * 9/1987 | Bohm et al. | 148/9 R |
| 5,475,196 | * 12/1995 | Lisec | 219/121.39 |

* cited by examiner

Primary Examiner—Mark Paschall
(74) Attorney, Agent, or Firm—Townsend & Banta

(57) ABSTRACT

A torch angle setting apparatus includes vertical links arranged in a vertical direction, the respective lower end of which is supported on a frame so as to be pivotally rotatable, and coupled with horizontal links at an upper end and an intermediate position of the vertical links for constituting a three-dimensionally parallel link. The torch angle setting apparatus also includes an inclining member constituted of a motor, an arm and a transmission member for inclining the vertical links by pivotally rotating the arm, a swinging member constituted of a swinging motor, a conducting member, splines for, including the inclining member, swinging conically the vertical links on fulcrums at the frame as a center, and a cutting torch moving in parallel to the vertical links. Accordingly, the simplification and miniaturization of the structure can be achieved in spite of the number of the hoses and cables connected to the torch when a bevel cutting is carried out with respect to the material to be cut by using a gas cutting torch or a plasma cutting torch.

5 Claims, 9 Drawing Sheets

TORCH ANGLE SETTING APPARATUS

BACKGROUND OF THE INVENTION

1. Field of the Invention

This invention relates to a torch angle setting apparatus advantageously used in a cutting apparatus carrying out a mold cutting while forming a bevel with respect to a material to be cut.

2. Description of Related Art

When figures having straight lines or curves are cut out from a material to be cut such as a steel plate or a stainless steel sheet or the like by using a torch, for example a gas cutting torch or a plasma cutting torch, a moving route of the torch is controlled so as to make the moving route an edge line of the desired figure, and a mold cutting has been carried out by driving the torch during this moving process. A cutting apparatus for carrying out the mold cutting includes a running cart running in the Y-axis direction along a laid rail and a transverse cart, equipped with the torch and mounted on the running cart, moving transversely in a direction perpendicular to the direction of the laid rail (X-axis direction), and the cutting apparatus is so constructed that the moving speed and moving direction of the torch can be controlled by controlling the speed and direction of the respective carts.

With regard to the moving control of the running cart and the transverse cart, a numerical control (NC) apparatus or a tracing apparatus which optically traces an edge line of a template may be used. In particular, a large cutting apparatus is generally constructed as an NC cutting apparatus in which an NC apparatus controls the moving of the respective carts according to the shape of the figure to be cut as well as the progress of the cutting program including the progress of the cutting process.

When welded to another product, a product, having been cut out from the material to be cut, may form a bevel around the outer periphery. In the case of carrying out the bevel cutting, it is required to control, at any time, an inclining direction of a torch to the normal direction with respect to the progressing direction of the cutting, while controlling to incline the torch according to the desired bevel angle. As a result, it is required for the mold cutting to swing the inclined torch according to the change of the progressing direction of the cutting.

Therefore, the mold cutting apparatus has a bevel cutting apparatus constituted of a torch block constructed so as to set the torch to the desired angle, a torch swinging apparatus swinging the torch block, a torch revolving apparatus revolving the torch accompanied by the swing of the torch block, where it is so constructed as to allow the product to have a bevel with the desired angle at its side surface by controlling the torch swinging apparatus according to the cutting progress.

In the above-mentioned bevel cutting apparatus, the axis of the torch is on the extension line of the swinging axis of the torch swinging apparatus when the torch is in a state vertical with respect to the surface of the material to be cut. The center of the pivotally rotation of the torch is set on the extension line of the axis of the torch when the inclination of the torch is carried out, and the intersection between the extension line of the axis of the torch and the extension line of the swinging axis is so adjusted to be on the surface or on the designated point in the depth direction of the material to be cut.

In the case where a gas cutting torch is used as a torch, the torch connects to hoses for supplying cutting oxygen, preheating oxygen and fuel gas, and in the case where a plasma cutting torch is used as a torch, the torch connects to hoses for supplying plasma gas, hoses for supplying and delivering cooling water, and cables for electricity. Thus, in a space formed between the torch and the torch swinging apparatus, there exist various types of hoses and cables, and therefore, when the torch block is swung according to the progressing direction of the cutting, the weight of the hoses and cables may become resistance, thereby forming notches on the cutting surface. In addition, the range of the swinging angle is limited since the hoses and cables twist, so the rotary chambers for relaying gas fluid or water, or slip rings for electricity are disposed for the purpose of dealing with the hoses or cables smoothly in swinging the torch.

In the torch swinging apparatus as mentioned above, the swinging axis and the axis of the torch are arranged in plane in the normal direction with respect to the progressing direction of the cutting. Thus, a variety of the hoses and cables exist on the swinging axis, and this raises a problem where it becomes difficult to deal with those hoses and cables smoothly. In particular, in accordance with the number of fluids for supplying the torch such as gas, water, or the like and the number of the cables to be connected, the structure of the torch swinging apparatus becomes complicated, so there are raised such problems as making the apparatus larger, increasing cost, or making the maintenance complicated.

SUMMARY OF THE INVENTION

It is an object of the invention to provide a torch angle setting apparatus dealing with hoses and cables smoothly with a simple structure.

To solve the above problems, a torch angle setting apparatus according to the invention is so constructed as including a frame mounted on a cart moving along a desired cutting line, a three-dimensionally parallel link in which a plural of vertical links are arranged in a vertical direction, each end of which is supported to the frame so as to be pivotally rotatable, and in which those vertical links are coupled to horizontal links at a several points in a height direction, an inclining member inclining the vertical links constituting the three-dimensionally parallel link, a swinging member for swinging, including the inclining member, the vertical links constituting the three-dimensionally parallel link, and a cutting torch attached to the three-dimensionally parallel link and moving in parallel to the vertical links accompanied by swinging motion of the vertical links.

In the torch angle setting apparatus as mentioned above, when the inclining member inclines the vertical links constituting the three-dimensionally parallel link according to the desired bevel angle, the cutting torch can be inclined in parallel to the vertical links. Also, when the swinging member swings the vertical links constituting the three-dimensionally parallel link, the cutting torch can be swung in parallel to the vertical links.

BRIEF DESCRIPTION OF THE DRAWINGS

The above and other objects and features of the invention are apparent to those skilled in the art from the following referred embodiments thereof when considered in conjunction with the accompanied drawings, in which.

DESCRIPTION OF THE PREFERRED EMBODIMENTS

Figure 1:
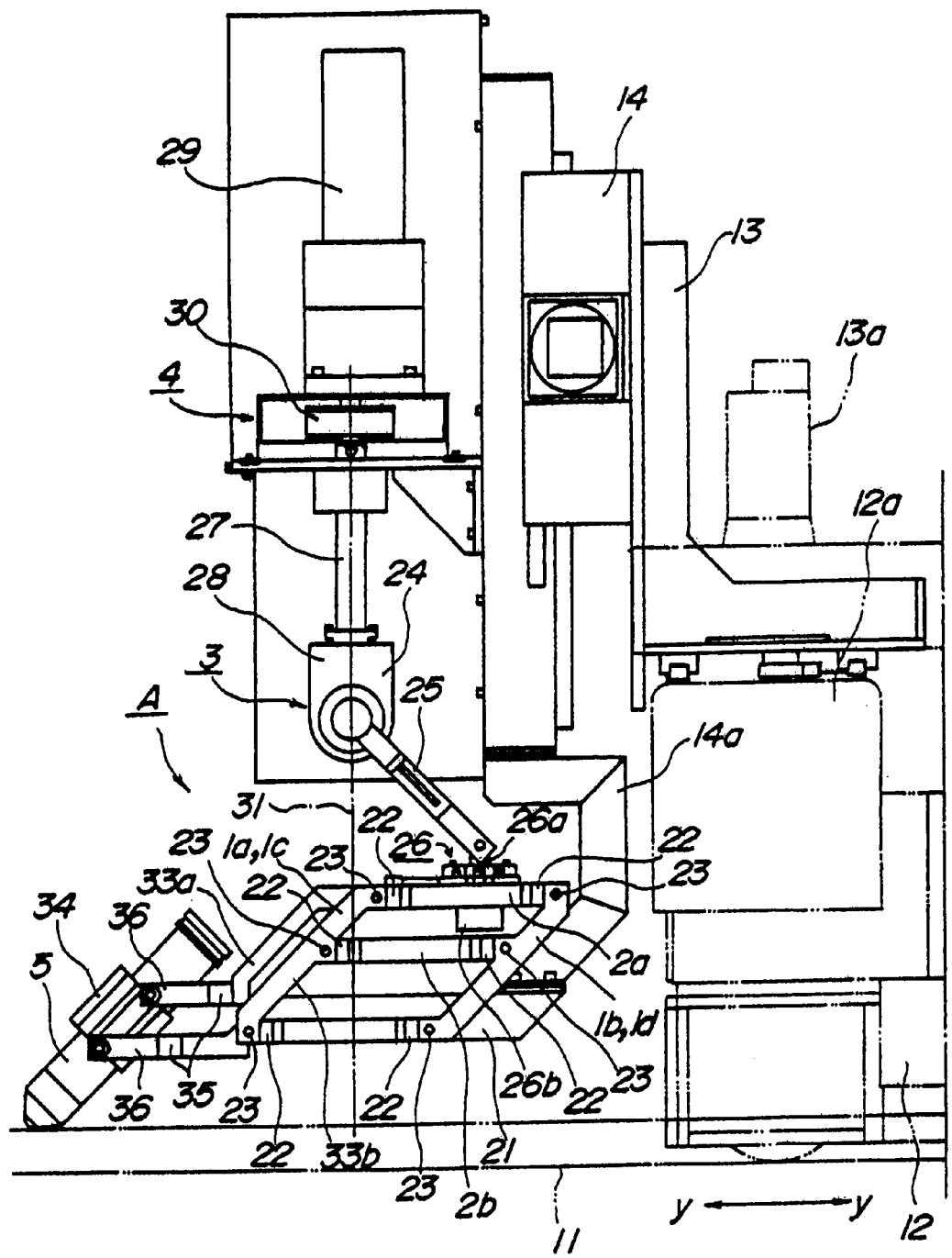
FIG. 1 is a side view showing a structure of a torch angle setting apparatus mounted on a cart.
Figure 2:
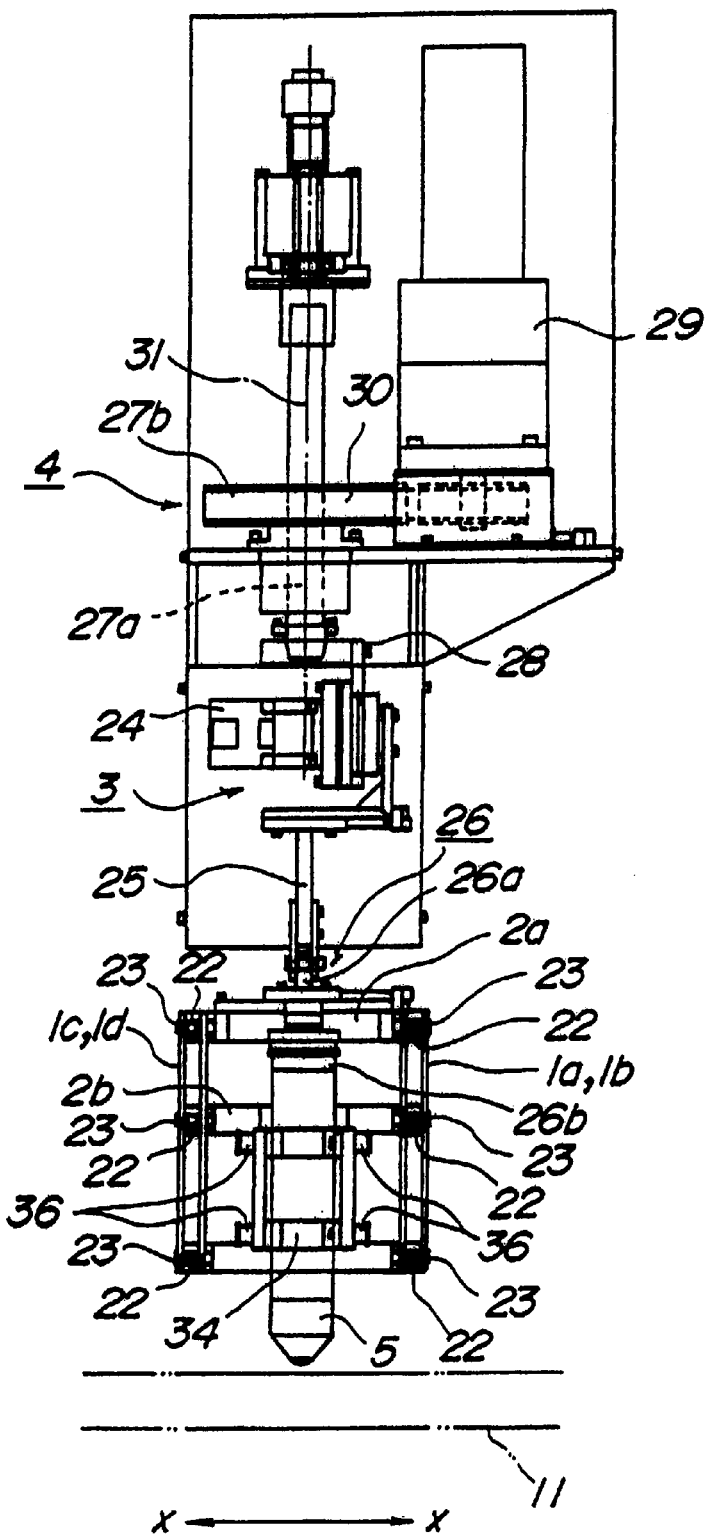
FIG. 2 is a front view showing the torch angle setting apparatus.
Figure 3:
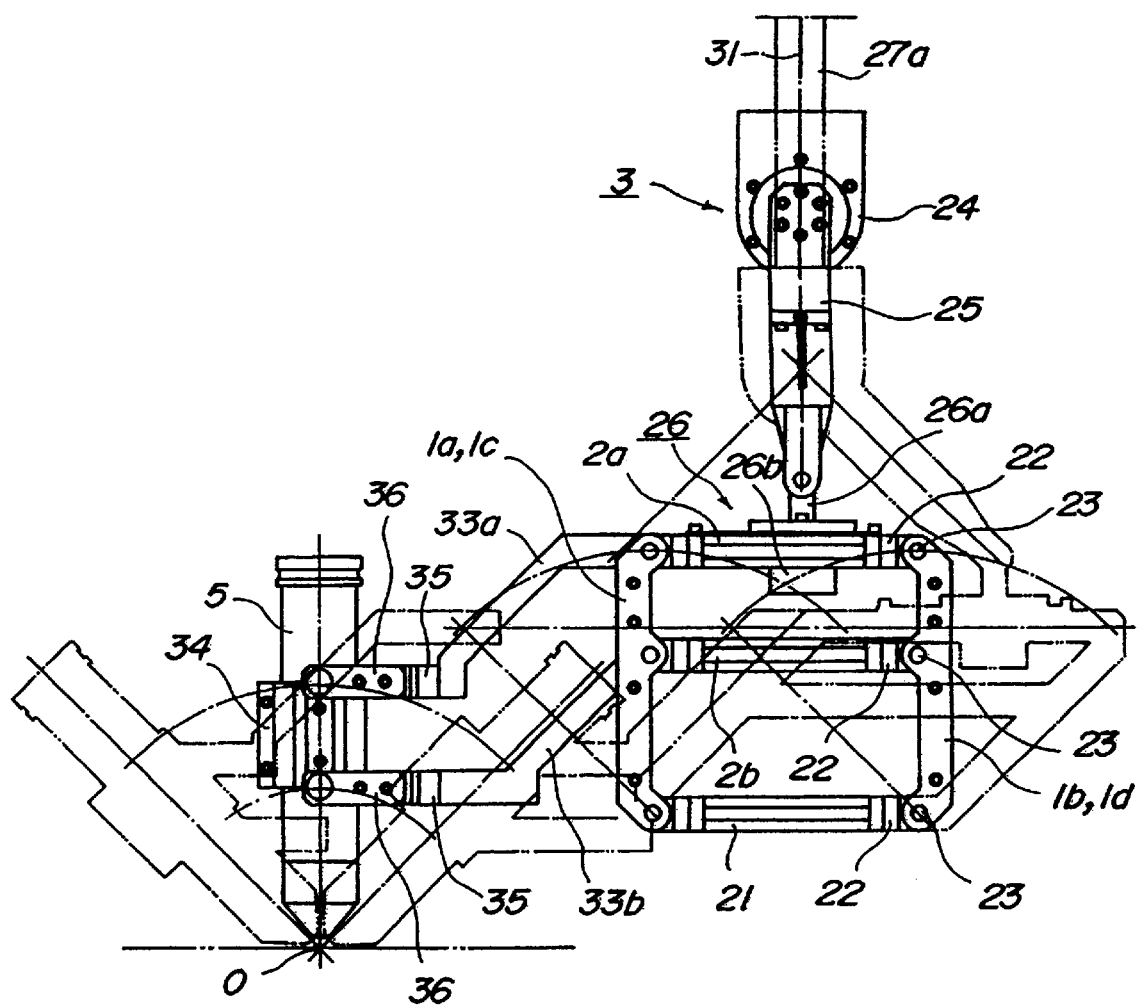
FIG. 3 is an illustration showing a working condition when a torch is inclined to the Y-axis direction.
Figure 4:
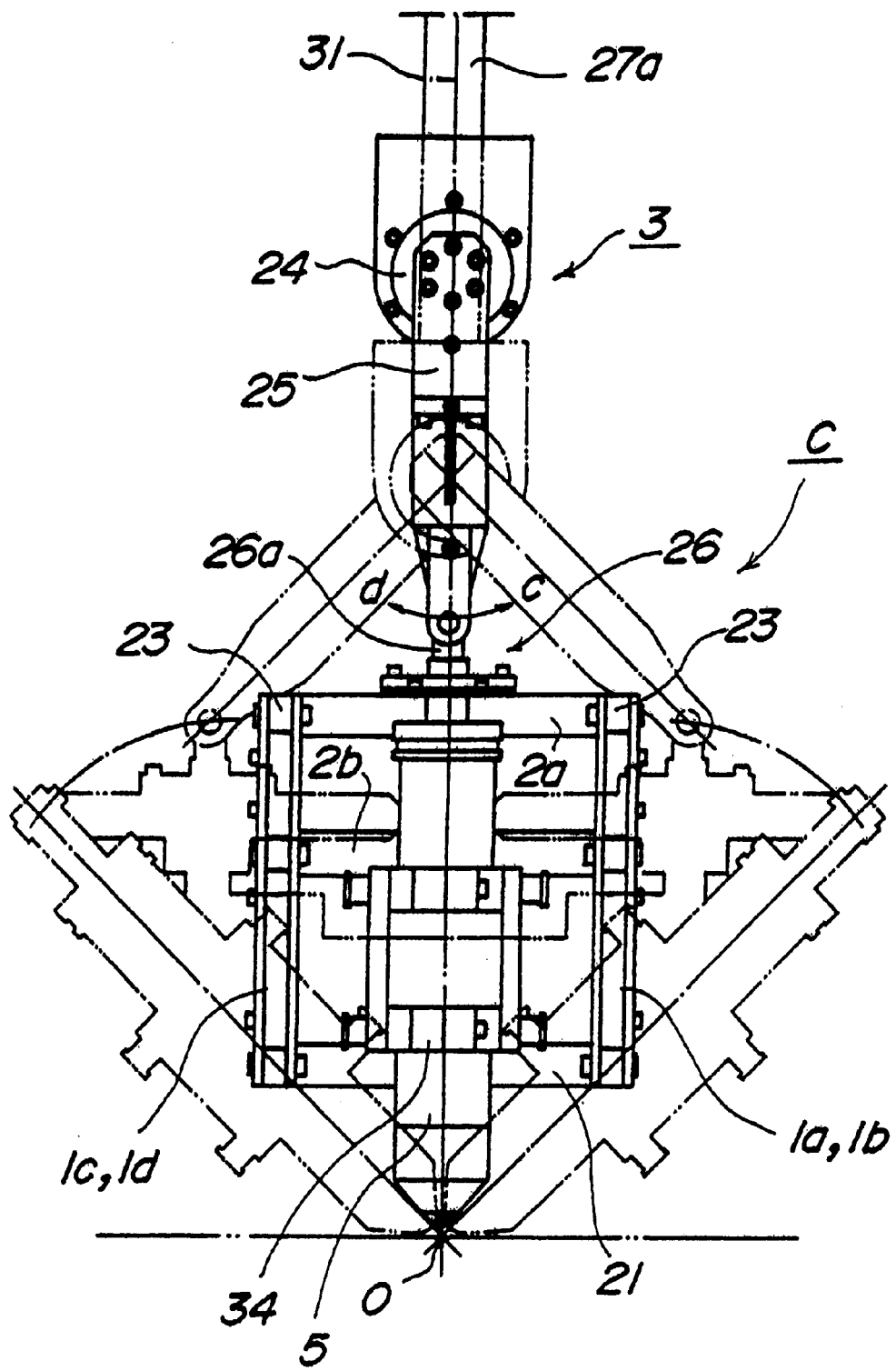
FIG. 4 is an illustration showing a working condition when the torch is inclined to the X-axis direction.
Figure 6A:
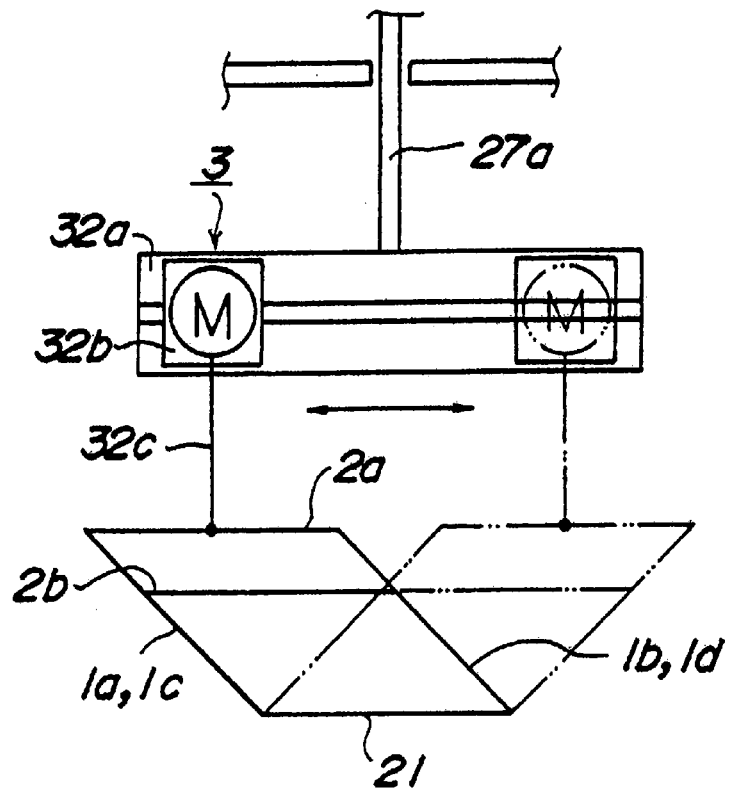
FIG. 6 is an illustration showing another example of a principle of inclining the torch.
Figure 6B:
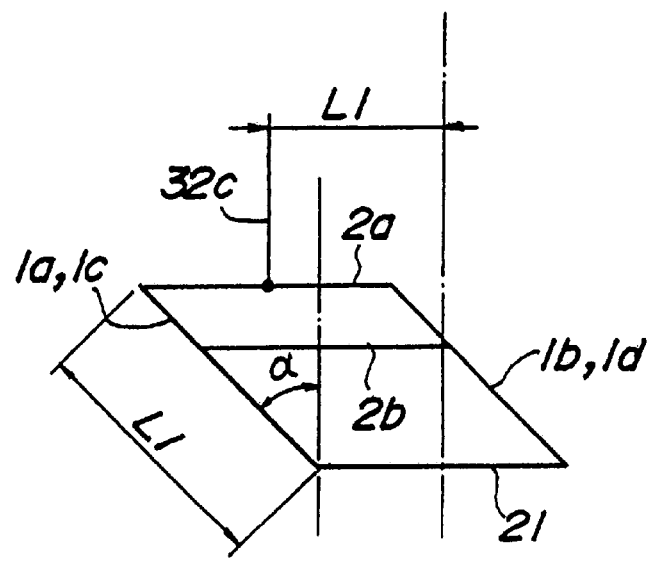
Figure 7:
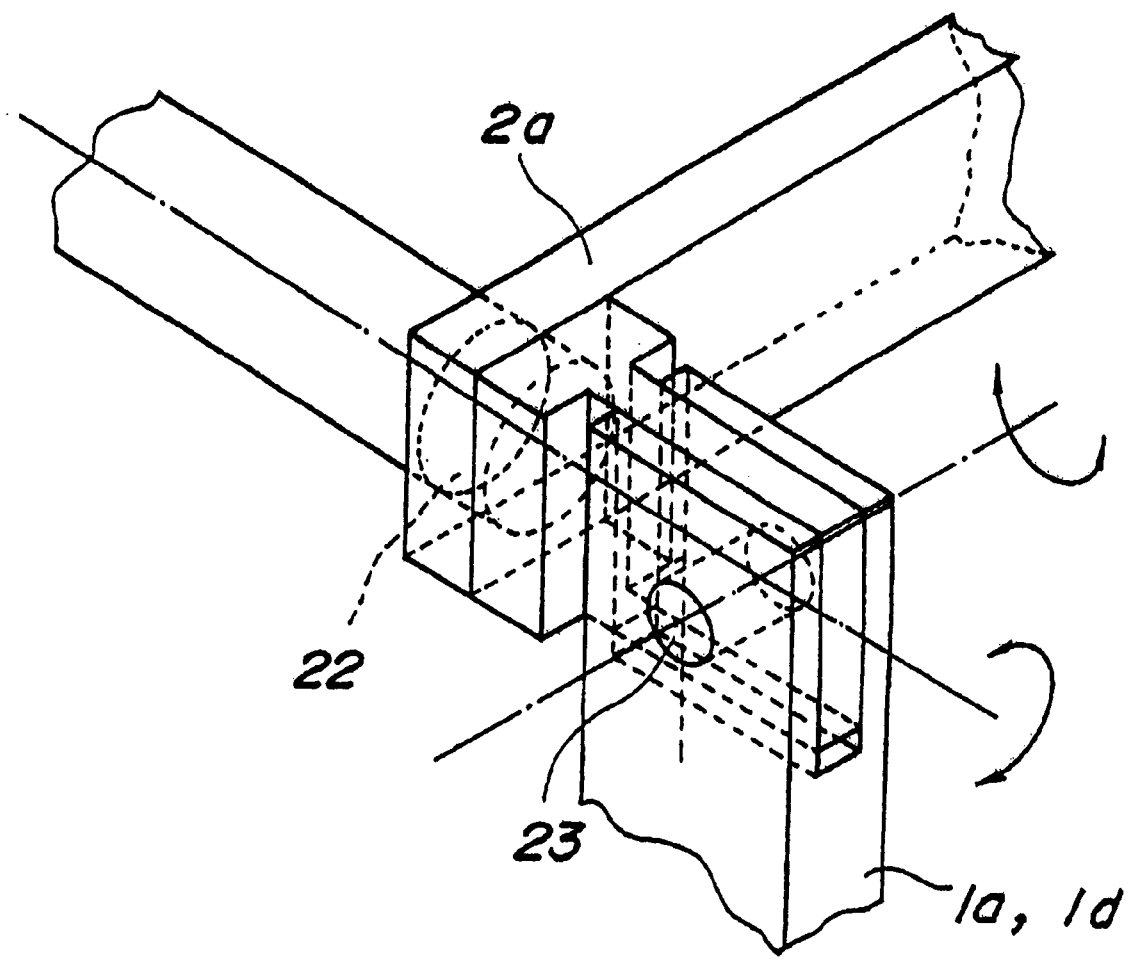
FIG. 7 is an illustration showing a structure of an articulated part of a vertical link and a horizontal link.
Figure 8:
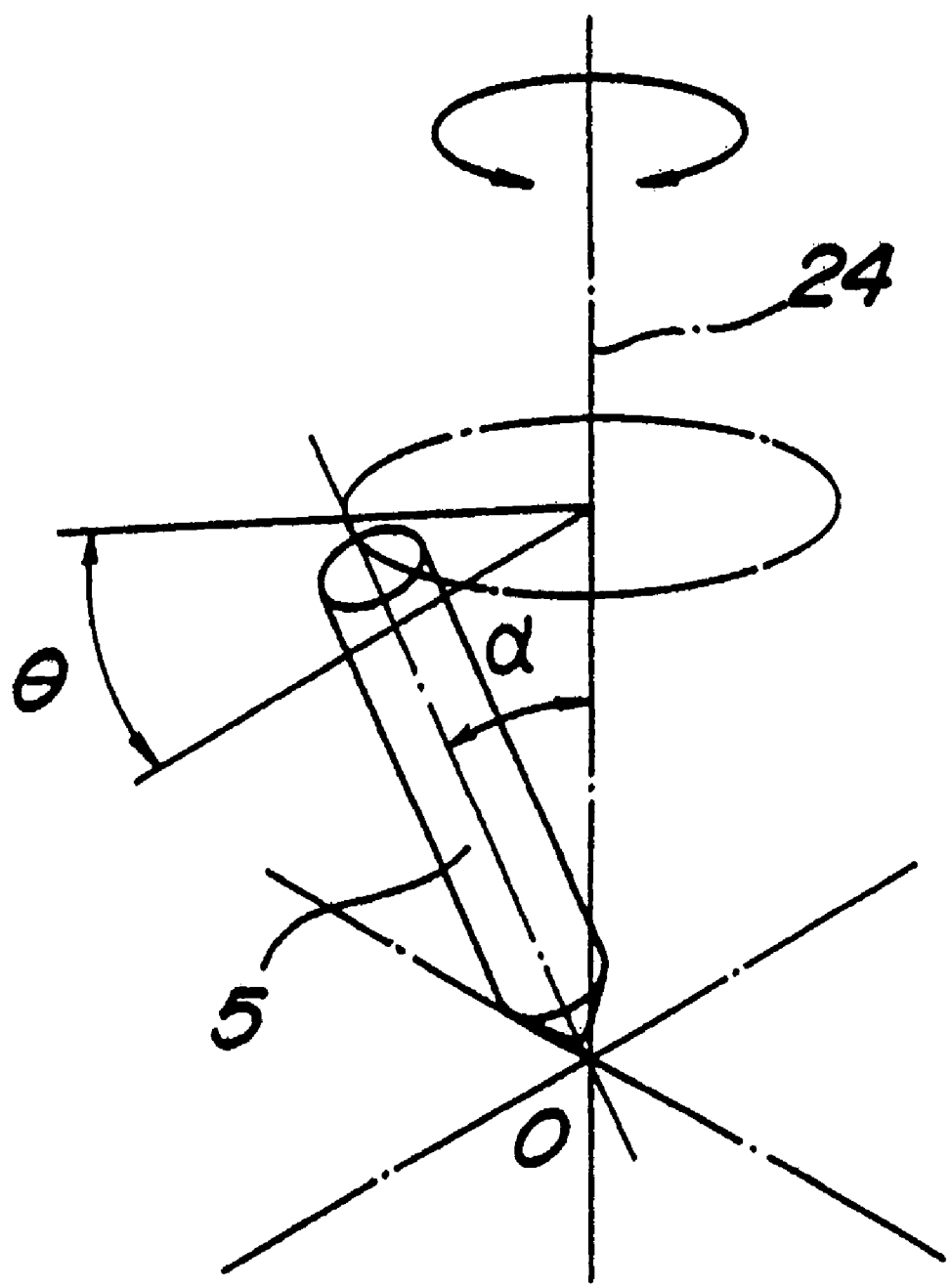
FIG. 8 is an illustration showing a principle of swinging the torch.
Figure 9:
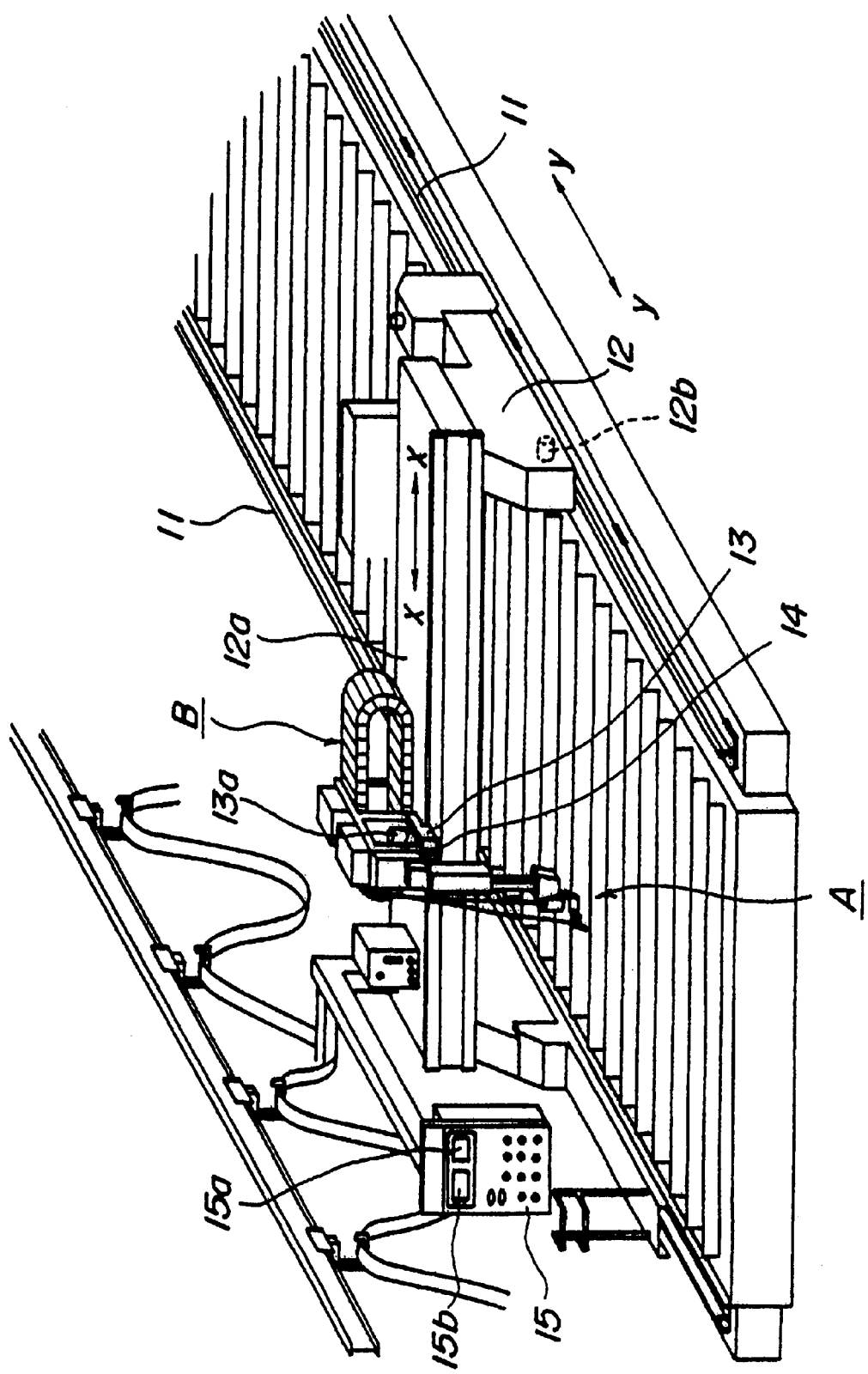
FIG. 9 is an illustration showing a structural example of a cutting apparatus carrying a torch angle setting apparatus according to the invention.

Referring to figures, a preferred embodiment of the torch angle setting apparatus according to the invention is shown. FIG. 1 is a side view showing a structure of a torch angle setting apparatus mounted on a cart. FIG. 2 is a front view showing the torch angle setting apparatus. FIG. 3 is an illustration showing a working condition when a torch is inclined to the Y-axis direction. FIG. 4 is an illustration showing a working condition when the torch is inclined to the X-axis direction. FIG. 5 is an illustration showing an example of a principle of inclining the torch. FIG. 6 is an illustration showing another example of a principle of inclining the torch. FIG. 7 is an illustration showing a structure of an intersection of a vertical link and a horizontal link. FIG. 8 is an illustration showing a principle of swinging the torch. FIG. 9 is an illustration showing a structural example of a cutting apparatus carrying a torch angle setting apparatus according to the invention.

A torch angle setting apparatus A according to an embodiment includes a threedimensionally parallel link composed of four vertical links 1a to 1d arranged in the vertical direction and two pairs of horizontal links 2a, 2b formed in a state of a frame where the horizontal links 2a, 2b are disposed at upper ends of, and intermediate positions of the vertical links 1a to 1d, and coupled to the respective vertical links 1a to 1d so as to be pivotally rotatable. It is so constructed that the vertical links 1a to 1d are inclined by an inclining member 3 according to a desired bevel angle while swung by a swinging member 4 according to the cutting direction, and therefore a torch 5, arranged in parallel to the vertical links 1a to 1d, can be set as corresponding to the bevel angle and can follow up changes of the cutting direction.

The torch angle setting apparatus A is used by mounted on an automatic cutting apparatus such as a numerical control cutting apparatus (NC cutting apparatus) as shown in FIG. 9. In this NC cutting apparatus B, after the input of the numerical data of the cutting line to be cut, the input data and pre-input cutting program controls the moving direction and speed of the torch 5 so that desired figures can be cut out from the material to be cut.

Now, the structure of the NC cutting apparatus B is roughly explained. According to the figure, the NC cutting apparatus B has a running cart 12 so mounted as to be able to run on a pair of rails 11 laid parallel to each other, and on a garter 12a of the running cart 12, there is a transverse cart 13 which cross-shifts in a direction perpendicular to the rail 11. The running cart 12 runs driven by a running motor 12b along the rails 11 (Y-direction), and the transverse cart 13 cross-shifts driven by a transverse motor 13a along the garter12a (X-direction). As a result, the transverse cart 13 is so constructed as a cart moving along the desired cutting line.

A torch up-down apparatus 14 is provided on the transverse cart 13, and in the torch up-down apparatus 14, the torch angle setting apparatus A is provided. As a result, the running of the running cart 12 and the transverse moving of the transverse cart 13 are synchronized, and this synchronization allows a torch 5 attached to the torch angle setting apparatus A to move to a desired direction at a desired speed.

According to the figure, a numeral 15 is a control panel storing the NC apparatus or a control unit for the torch angle setting apparatus A inside, and providing on its surface an input unit 15a to which the information on the plate material to be cut or its shape and the information on the bevel angle are input, and a display 15b.

Next, the structure of the torch angle setting apparatus A is explained referring to the FIG. 1, FIG. 2 and FIG. 3. As shown in FIG. 1, the torch angle setting apparatus A is attached to the torch up-down apparatus 14 mounted on the transverse cart 13 which works as a cart, and the torch angle setting apparatus A is so constructed as to incline the torch 5 corresponding to the desired bevel angle when a bevel cutting starts, to swing the torch 5 according to the cutting direction during the bevel cutting work, and to maintain the height from the torch 5 to the surface of the material to cut at a previously set value.

A base 14a constituting the torch up-down apparatus 14 is secured to a frame 21 constituting the torch angle setting apparatus A, and four vertical links 1a to 1d arranged in the vertical direction are attached respectively so as to pivotally rotatable. At the upper ends of the four vertical links 1a to 1d as well as the intermediate positions (not necessarily the midpoints) the between the upper ends 1a to 1d and the frame 21, arranged are horizontal links 2a, 2b formed respectively in a state of a quadrilateral frame, and the intersection between the horizontal links 2a, 2b and each of the vertical links 1a to 1d are so connected through bearings 22 and pins 23 as to pivotally rotatable.

The four vertical links 1a to 1d coupled with the two horizontal links 2a, 2b constitutes an integrated three-dimensionally parallel link, where the providing of an external force to any of those vertical links 1a to 1d allows the vertical links 1a to 1d to incline simultaneously to the desired direction.

The respective lower end of the vertical links 1a to 1d is attached to the frame 21 through bearings 21 and pins 23, and the vertical links 1a to 1d can incline to the desired direction on fulcrums at the frame 21 (lower ends of the vertical links 1a to 1d) as a center by driving the inclining member 3 and the swinging member 4.

The inclining member 3, having a function of inclining the vertical links 1a to 1d on fulcrums as a center, can incline the torch 5 according to the inclination of the vertical links 1a to 1d. The inclining member 3 is composed of a motor 24, an arm 25 pivotally rotating by driving the motor 24, and a transmission member 26 having a axis 26a arranged in a vertical direction and so connected to the arm 25 as to be pivotally rotatable, and a bearing member 26b supporting the axis 26a so as to revolve it, and attached to the horizontal link 2a constituting the three-dimensionally parallel link.

The motor 24 is attached through a bracket 28 to an end of an axis, for example, a spline 27a, movable to the direction of the axis as well as transmittable a force in a revolving direction. The motor 24 allows the arm 25 whose axis extends in the horizontal direction to pivotally rotate in a vertically in-plane state.

The arm 25 is to incline the vertical links 1a to 1d according to the bevel angle by transmitting the revolution of the motor 24 and the swing of the swinging member 4 and to change the inclining direction while maintaining the bevel angle. The arm 25 has a length which is previously set according to the maximum inclining angle at the designing stage.

The transmission member 26, composed of the axis 26a and the bearing member 26b, is to transmit, through the bearing 26b, the force having an effect on the arm 25 so connected as to be pivotally rotatable around the axis 26a, and it inclines the vertical links 1a to 1d according to the direction of the force having an effect on the arm 25.

In the inclining member 3 thus constructed, when the motor 24 revolves, the arm 25 rotates pivotally along with this revolution, and according to this pivotal rotation, the horizontal force as a pivotal rotation of the arm 25 has an effect on the axis 26a. Then, the horizontal force having an effect on the axis 26a is transmitted through the bearing 26b to the horizontal link 2a, thereby inclining the vertical links 1a to 1d on the respective lower ends of those links as the fulcrums to the pivotally rotating direction of the arm 25.

The swinging member 4 is to change the inclining direction for forming the bevel by swinging vertical links 1a to 1d on the respective fulcrums as a center. Thus, the swinging member 4 is constituted of a swinging motor 29, a spline boss 27b engaging a spline axis 27a, a conducting member 30 selected from combinations such as a combination of a gear series, a chain and a sprocket wheel, or a combination of a timing belt and timing pulley.

Thus, when the motor 29 revolves, this revolution is transmitted by the conducting member 30 through the spline boss 27b to the spline axis 27a, thereby swinging the motor 24 constituting the inclining member 3 around a swinging axis 31 as a center that corresponds to the axis of the spline axis 27a. Then the motor 24 swings around the swinging axis 31 as a center, and accompanied by this swing, the arm 25 is to be swung around the swinging axis 31 as a center in a horizontal in-plane state without changing the inclining angle.

FIG. 3 shows a state where the pivotally rotating surface of the arm 25 is in the Y-axis direction. FIG. 4 shows a state where the spline axis 27a swings 90 degrees from the position shown in FIG. 3, so the pivotally rotating surface of the arm 25 comes to be on X-axis.

The force accompanied by the swing of the arm 25 in a horizontal in-plane state is transmitted through the axis 26a and the bearing 26b to the horizontal link 2a, and the relatively pivotal rotation with the bearings 22 and the pins 23 is carried out, thus to swing the upper ends of those links 1a to 1d on the fulcrums, as a center, at the lower ends of the vertical links. In other words, the vertical links 1a to 1d change their inclining direction while maintaining the inclining angle corresponding to the bevel angle, and therefore, the vertical links 1a to 1d carry out a conical movement on the fulcrums as a center at the intersection points with the frame 21.

Referring to FIG. 5, a principle of inclining the vertical links 1a to 1d in the torch angle setting apparatus A thus structured is explained.

Figure 5A:
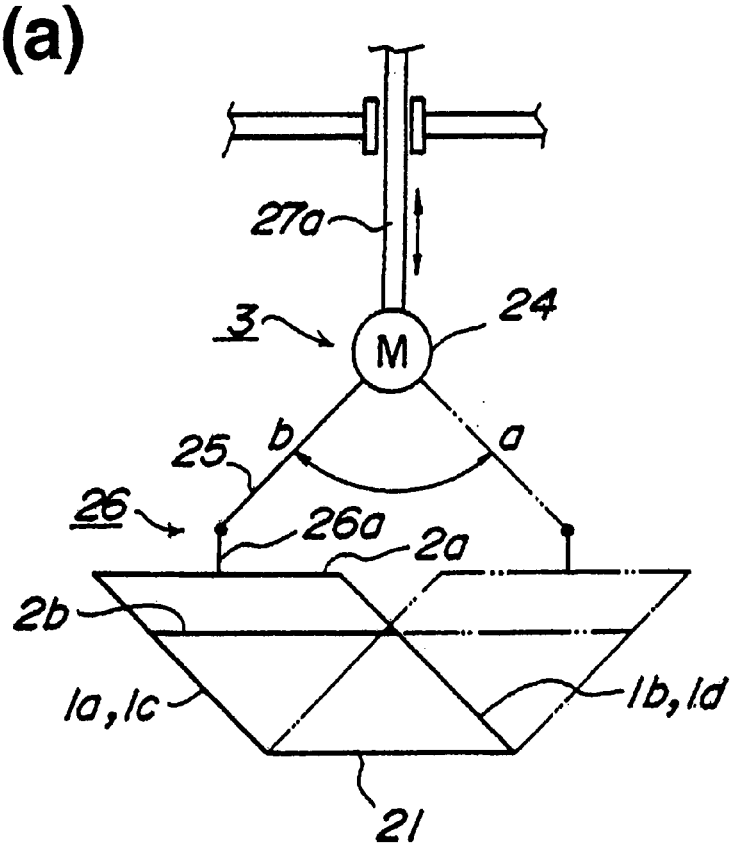
FIG. 5 is an illustration showing an example of a principle of inclining the torch.
Figure 5B:
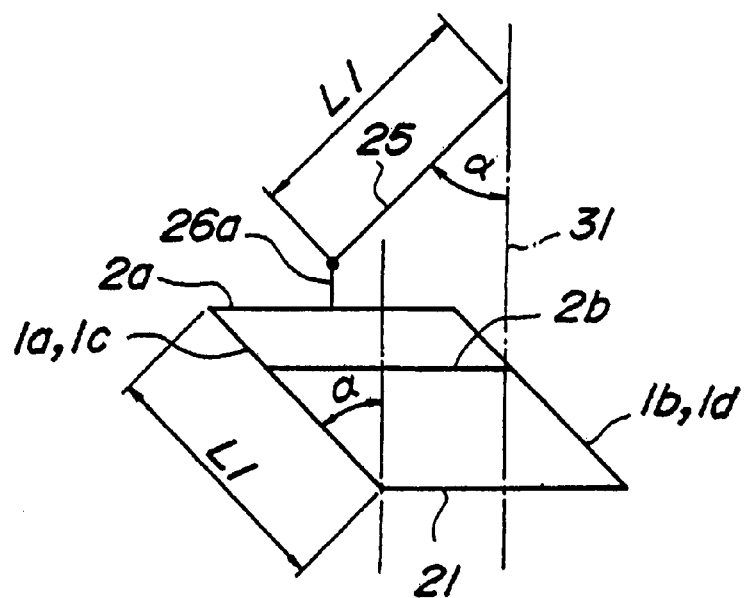

As shown in FIG. 5(a), the vertical links 1a to 1d are so constructed as to be pivotally rotatable omnidirectionally on the intersection points with the frame 21 as a respective center and to constitute the three-dimensionally parallel link coupled with the horizontal links 2a, 2b. Thus, when the arm 25 is pivotally rotated to the direction of arrow a or arrow b by the motor 24, this pivotal rotation causes each of the vertical links 1a to 1d to pivotally rotate. At this time, provided that the length of the arm 25 is set as L1 and the length of the respective vertical links 1a to 1d is set as L1, the both of the pivotally rotating angle of the arm 25 and the inclining angle of the respective vertical links 1a to 1d have the equal angle $\alpha$ as shown in FIG. 5(b). In this case, the controlling of the revolving angle of the motor 24 to be the desired angle makes it possible to control the inclining angle of the respective vertical links 1a to 1d to have the angle equal to the mentioned desired angle.

During the process of inclining the vertical links 1a to 1d, the position of the motor 24 in the height direction is to change to go up and down, accompanied by the pivotal rotation of the arm 25, between the continuous line and the chain double-dashed line as shown in FIG. 3. By attachment of the motor 24 to the tip of the spline axis 27a, therefore, the spline axis 27a moves slidingly to the axis direction with respect to the spline boss, and allows the motor 24 to change smoothly its position in the up-down direction.

It is possible to incline the vertical links 1a to 1d as described above by changing the position of the horizontal direction of the transmission member 26 that has the axis 26a. Thus, the inclination of the vertical links 1a to 1d is not necessarily achieved by the pivotal rotation of the arm 25, but it is possible to obtain the desired inclining angle where, as shown in FIG. 6(a) for example, the inclining member 3 is composed of a horizontal bracket 32a, a carriage 32b moving along the horizontal bracket 32a, and a rod 32c as a linkage between the carriage 32b and the horizontal link 2a, and where the carriage 32b moves L1 sin ca to the horizontal direction when the vertical links 1a to 1d are inclined from a vertical state to have the angle $\alpha$.

The torch 5 is detachably attached to a torch holder 34 which is attached to the ends of an arm 33a and 33b projected from the respective horizontal links 2a, 2b. The arm 33a and 33b are formed downwardly with an equal angle, thereby forming a parallelogram when attached respectively to the horizontal links 2a, 2b. Supporting members 36 are attached respectively to the ends of the arm 33a and 33b through bearings 35, and the torch holder 34 is supported so as to be pivotally rotatable to the supporting member 36.

Thus, the axis of the torch 5, when attached to the torch holder 34b, is parallel to the vertical links 1a to 1d constituting the three-dimensionally parallel link. Accompanied by the inclination of the vertical links 1a to 1d driven by the inclining member 3 and the change of the inclining direction driven by the swinging member 4, the torch 5 is also inclined to the same direction as mentioned above while changing its inclining direction.

In other words, as shown in FIG. 8, the torch 5, although the axis of the torch 5 exists on the different position from the swinging axis 31, is inclined accompanied by the drive of the inclining member 3 to have an angle a from the fulcrum O as a center which is set as on the extension line of the torch 5, while the torch 5 changes its inclining direction, accompanied by the drive of the swinging member 4, by swinging an angle $\theta$ on the cone having its fulcrum O as a center. As a result, the torch can carry out the conical movement of apex angle of 2 $\alpha$ with the fulcrum O as a center, thus to be able to correspond to the change of the progressing direction for the cutting during the process of this movement.

Next, the procedure for setting up the angle of the torch 5 is explained according to the torch angle setting apparatus A thus constructed as the above.

First, informations on the shape to be cut as well as on the bevel angle α are input in the NC cutting apparatus B. According to the informations entered, the NC cutting apparatus B is to transmit drive signals to the running motor 12b of the running cart 12 and the transverse motor 13a of the transverse cart 13 respectively, and the synchronization of the motors 12b and the 13a allows the transverse cart 13 (torch 5) to move along the cutting line corresponding to the edge line of the desired shape.

According to the entered bevel angle α, a drive signal is transmitted to the motor 24 which constitutes the inclining member 3, and based on this signal, the motor 24 is to revolve for pivotally rotating the arm 25 toward the designated direction (See, FIG. 3). Accompanied by this pivotal rotation, the vertical links 1a to 1d are inclined to the angle α, and then the torch 5 disposed in parallel to the respective vertical links 1a to 1d is inclined to the angle α, making it possible to set the torch 5 to be desired bevel angle (α).

In the mold cutting, the moving route of the torch 5 delineates a closed loop, and the inclining direction of the torch in conducting the bevel cutting becomes the normal direction with respect to the cutting line. Thus, when the desired cutting line has a curved line, the driving signal for corresponding the inclining direction of the torch 5 to the centered direction of the circular arc which constitutes the cutting line is to be transmitted to the swinging motor 29 of the swinging member 4, and then based on the signal thus obtained, the swinging motor 29 revolves for revolving the spline axis 27a. Accompanied by this revolution, the arm 25 rotates pivotally to the horizontal direction while keeping the inclining angle, thus to change the inclining direction of the vertical links 1a to 1d to the centered direction of the circular arc. This makes the torch 5 change its inclining direction while keeping the set bevel angle α.

In the link structure of the invention, the vertical links connect the horizontal links with bendable joints, and no limitation is made with respect to formations of the vertical links and the horizontal links. For example, the vertical links may be hard links as in the embodiment of the invention, or the whole or part of the vertical links may be constituted of flexible material such as a wire or the like.

By structuring the vertical links and the horizontal links so as to be elastic, inclination or rotation of the cutting torch can be further controlled in a delicate way.

In the torch angle setting apparatus according to the invention as explained in the above in detail, plural vertical links, the ends of which are supported to the frame so as to be pivotally rotatable, constitute the three-dimensionally parallel link by coupled with the horizontal links at several points in the height direction, and then, by making the horizontal links inclined by the inclining member as well as swung by the swinging member, the cutting torch arranged in parallel to these horizontal links can be inclined with the desired bevel angle as well as swung conically on a fulcrum as a center which is set on the extension line of the torch.

Since the swinging center of the swinging member does not necessarily correspond to the swinging center of the cutting torch, a large space can be formed above the cutting torch, thus to easily deal with hoses or cables connected to the cutting torch.

Simply changing the inclining direction of the cutting torch can accomplish the conical swing of the cutting torch, and therefore, the cutting torch does not revolve itself. As a result, rotary chambers or slip rings are not required, thereby achieving a simplification of the structure of the apparatus.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A torch angle setting apparatus comprising:
   a frame mounted on a movable cart;
   a three-dimensionally parallel link in which a plural of vertical links are arranged in a vertical direction, in which each end of the vertical links is supported to said frame so as to be pivotally rotatable, and in which said vertical links are coupled to horizontal links at several points in a height direction;
   an inclining member inclining the vertical links constituting said threedimensionally parallel link;
   a swinging member for swinging, including said inclining member, said vertical links constituting said three-dimensionally parallel link; and
   a cutting torch inclining or rotating accompanied by swinging motion of the vertical links attached to said three-dimensionally parallel link.

2. The torch angle setting apparatus according to claim 1, wherein said vertical links and said horizontal links are made partly or entirely of flexible members.

3. The torch angle setting apparatus according to claim 1, wherein an inclining angle as well as swinging motion of the cutting torch are set by adjustment of extents of inclination and swinging motion of said vertical links.

4. A torch angle setting apparatus comprising:
   a frame mounted on a movable cart;
   a three-dimensionally parallel link in which a plural of vertical links are arranged in a vertical direction, in which each end of the vertical links is supported to said frame so as to be pivotally rotatable, and in which said vertical links are coupled to horizontal links at several points in a height direction;
   an inclining member inclining the vertical links constituting said three-dimensionally parallel link;
   a swinging member for swinging, including said inclining member, said vertical links constituting said three-dimensionally parallel link; and
   a cutting torch moving in parallel to the vertical links accompanied by swinging motion of the vertical links attached to said three-dimensionally parallel link,
   wherein said cutting torch is inclined or rotated by swinging motion of said three-dimensionally parallel link without rotation of said three-dimensionally parallel link.

5. The torch angle setting apparatus according to claim 2, wherein an inclining angle as well as swinging motion of the cutting torch are set by adjustment of extents of inclination and swinging motion of said vertical links.

* * * * *